(12) United States Patent
Conway

(10) Patent No.: US 9,225,582 B1
(45) Date of Patent: Dec. 29, 2015

(54) MANAGING AND ENABLING INTERACTION WITH COMMUNICATION INFORMATION

(75) Inventor: David P. Conway, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/249,580

(22) Filed: Sep. 30, 2011

Related U.S. Application Data

(63) Continuation of application No. 13/077,113, filed on Mar. 31, 2011.

(51) Int. Cl.
H04L 29/08 (2006.01)
H04M 1/725 (2006.01)

(52) U.S. Cl.
CPC ..... *H04L 29/08072* (2013.01); *H04M 1/72519* (2013.01)

(58) Field of Classification Search
CPC .. G06Q 10/10; H04L 29/06; H04L 29/08072; H04L 29/06027; H04L 12/581
USPC ........................ 455/415, 446, 414.1; 709/206
See application file for complete search history.

(56) References Cited

U.S. PATENT DOCUMENTS

| | | | |
|---|---|---|---|
| 7,283,813 B2 | 10/2007 | Hamanaga et al. | |
| 7,680,513 B2 * | 3/2010 | Haitani et al. | 455/556.2 |
| 7,831,267 B2 * | 11/2010 | Klassen et al. | 455/466 |
| 2005/0130631 A1 * | 6/2005 | Maguire et al. | 455/414.1 |
| 2005/0193345 A1 * | 9/2005 | Klassen et al. | 715/751 |
| 2006/0173961 A1 | 8/2006 | Turski et al. | |
| 2007/0047697 A1 | 3/2007 | Drewry et al. | |
| 2007/0293206 A1 * | 12/2007 | Lund | 455/415 |
| 2008/0133580 A1 * | 6/2008 | Wanless et al. | 707/102 |
| 2010/0075638 A1 * | 3/2010 | Carlson et al. | 455/412.1 |
| 2010/0093316 A1 * | 4/2010 | Doppler et al. | 455/414.1 |
| 2011/0119610 A1 * | 5/2011 | Hackborn et al. | 715/768 |
| 2011/0231499 A1 | 9/2011 | Stovicek et al. | |
| 2011/0274257 A1 * | 11/2011 | Vaananen | 379/93.01 |

OTHER PUBLICATIONS

'SalesForce.com,' Wikipedia, last updated Apr. 13, 2011, 9 pages.
Office Action for U.S. Appl. No. 13/077,113 dated Jun. 19, 2012, 14 pages.
Office action dated Jun. 28, 2013 issued in U.S. Appl. No. 13/077,113, 22 pgs.
Office Action for U.S. Appl. No. 13/077,113 dated May 23, 2014, 29 pages.

* cited by examiner

*Primary Examiner* — Claire X Pappas
*Assistant Examiner* — Ngan Pham Lu
(74) *Attorney, Agent, or Firm* — Fish & Richardson P.C.

(57) ABSTRACT

A communications device receives a trigger event and, in response to the trigger event, retrieves identification information and identifies a correspondent entity associated with the trigger event based on the identification information. Communication information relating to one or more communications events associated with the correspondent entity is then retrieved, organized, and displayed in one or more views on the communications device.

22 Claims, 7 Drawing Sheets

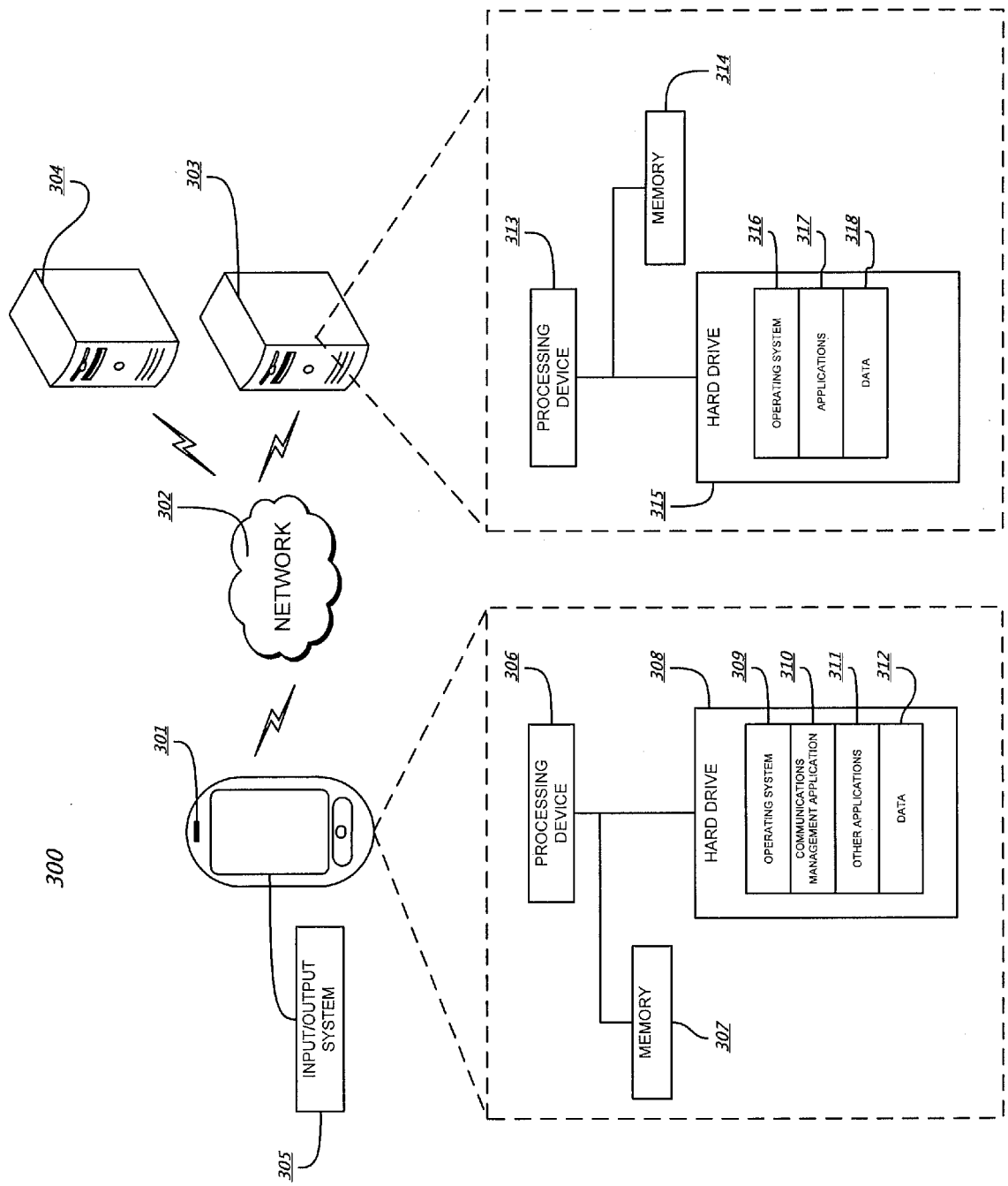

MANAGING AND ENABLING INTERACTION WITH COMMUNICATION INFORMATION

TECHNICAL FIELD

This patent application relates to managing and enabling interaction with communication information on a communications device, e.g., on a mobile device.

BACKGROUND

Communications devices such as personal computers and smartphones enable users to communicate in a variety of ways. Users of mobile devices such as smartphones may send and receive, e.g., telephone calls, e-mail messages, text messages sent via Short Message Service (SMS), and various Internet-based communications.

SUMMARY

This specification describes techniques for managing and enabling interaction with communication information. An example of such a technique includes receiving a trigger event on a communications device and, in response to the trigger event, retrieving identification information and identifying a correspondent entity associated with the trigger event based on the identification information. Communication information relating to one or more communications events associated with the correspondent entity may then be retrieved, organized, and displayed in one or more views on the communications device. This example may include one or more of the following features, or any others described in this specification, either alone or in combination.

According to one aspect of the subject matter described by this specification, a trigger event, such as a communications event or an input effected via a user interface, may be received by a communications device, e.g., a mobile device, prompting the retrieval of identification information. The identification information may be retrieved from one or more local or remote data sources, which may be associated with one or more communications services. A correspondent entity associated with the trigger event, which may include one or more individuals or groups of individuals, may be identified based on the retrieved identification information.

According to another aspect, communication information relating to one or more communications events associated with the identified correspondent entity may be retrieved. The communications events may include one or more communications events directed between the user of the mobile device and the correspondent entity, as well as one or more communications events originating with the correspondent entity but not directed to the user. Obtaining the communication information may include obtaining search criteria from one or more local or remote sources, using the search criteria to search one or more local or remote sources for the one or more communications events, and obtaining the communication information based on the search.

According to another aspect, the communication information may be organized and displayed. Organizing the communication information may include obtaining organizational criteria from one or more local or remote sources and organizing the communication information in accordance with the criteria. The organized communication information may be displayed in one or more views on the communications device. Display of the organized communication information may include obtaining displaying criteria from one or more local or remote sources and displaying the organized communication information in accordance with the criteria.

According to another aspect, a communications management application of the communications device may be configured to perform one or more of the operations described above. For example, the search criteria, the organizational criteria, and the display criteria may be obtained by the communications management application.

According to another aspect, the communications management application of the communications device may be further configured to interface with other applications of the communications device and/or with applications of other computers. Interfacing with other applications may allow the communications management application to access communications channels, services, and events, and may allow the communications management application to access additional search, organizational, and display criteria. Additionally, interfacing with other applications may further extend the functionality of the communications management application by enabling users and third party developers to integrate customized communications filters and views as well as new communications channels and services.

All or part of the foregoing may be implemented as a computer program product that includes instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

FIG. 3 is a diagram of a system on which the processes of FIGS. 1 and/or 2 may be implemented.

Like reference symbols in the various drawings indicate like elements.

DETAILED DESCRIPTION

Described herein is a process for managing and enabling interaction with information concerning communications on a communications device, e.g., on a personal computer, or on a mobile device such as a smartphone. The process may include receiving a trigger event on a device, retrieving identification information in response to the trigger event, identifying a correspondent entity associated with the trigger event based on the identification information, retrieving communication information relating to one or more communications events associated with the correspondent entity, organizing the communication information, and displaying organized communication information in one or more views on the device.

Figure 1:
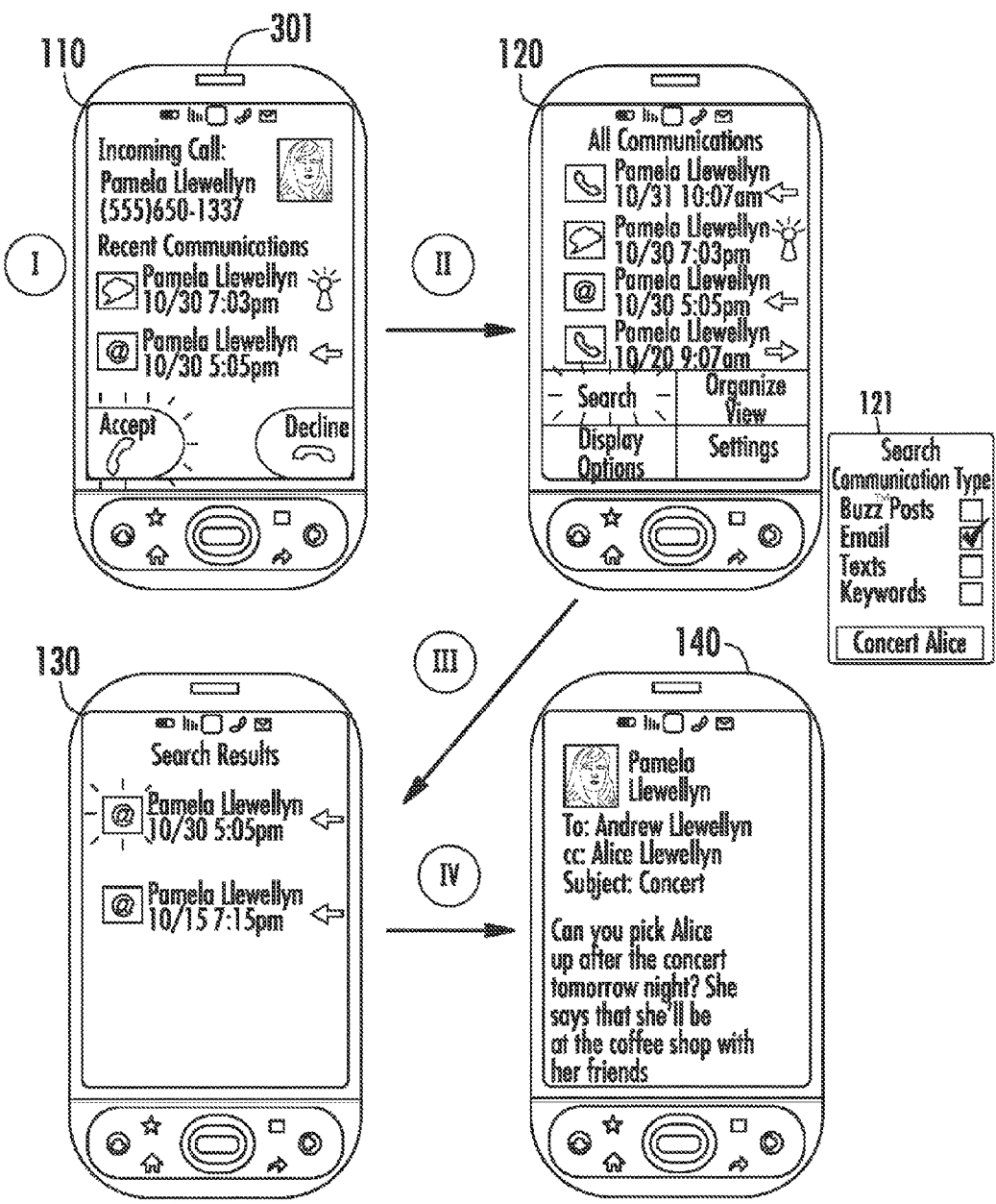
FIG. 1 provides conceptual views illustrating an example application of a process for the management and display of communication information.

FIG. 1 provides conceptual views of the application of the foregoing process. The process may be implemented by code, referred to here as a communications management application.

FIG. 1 illustrates four example conceptual views, 110, 120, 130, and 140, that are displayed on a mobile device 301 during example states (I), (II), (III), and (IV), respectively. Together, these four conceptual views provide an example of a process for the management and display of communications, e.g., on a mobile device. The example states (I), (II), (III), and (IV) may be time-sequenced states, or they may occur in a sequence that is different than the illustrated sequence.

In more detail, at state (I), depicted by conceptual view 110, a mobile device 501 has received a trigger event. In this example, the trigger event is a communications event, such as an incoming phone call. In response to the trigger event, the communications management application retrieves identification information and identifies a correspondent entity associated with the trigger event, in this case an individual, based on the retrieved identification information. Prior to the user's acceptance of the incoming phone call, the communications management application may retrieve, display, and organize, in a single view according to default criteria, communication information relating to recent communications events associated with the correspondent entity. Providing this information to the user enables the user to quickly scan the recent communications information so as to better understand the context of the incoming phone call.

In some implementations, the default criteria used by the communications management application in retrieving, displaying, and organizing communications information can be customized by the user or by another entity. For example, the default criteria may be customizable such that different criteria apply to different correspondent entities.

In some implementations, the user may act on the information provided by the communications management application by, e.g., selecting the displayed identification information in order to access a web page associated with the identified correspondent entity or to run an automatic search based on information associated with the identified correspondent entity. Similarly, the user could select displayed recent communications events in order to view communication information or content associated with those events.

At state (II), depicted by conceptual view 120, following the user's acceptance of the incoming phone call, the communications management application retrieves, displays, and organizes, in a single view according to default criteria, communication information relating to communications events associated with the correspondent entity. In this case the correspondent entity is Pamela Llewellyn, the individual who placed the phone call directed to the user. The displayed communication information includes information pertaining to communications events directed between the user of the mobile device and the correspondent entity. In this example, communications events directed between the user and the correspondent entity include two telephone calls and an email. The displayed communication information also includes information pertaining to a communication event originating with the correspondent entity but not necessarily directed to the user. In this example, a social network post.

In an alternative implementation, the communications management application may retrieve, display, and organize, in a single view according to default criteria, communication information relating to communications events associated with both the correspondent entity and other entities associated with communications groups to which the correspondent entity belongs. For example, if Pamela Llewellyn were a member of the user's "Family" group, the communications management application could provide communication information associated with other members of the "Family" group, in addition to the communication information associated with Pamela Llewellyn.

A communications group may be either explicit, e.g., a "Family" group including individual correspondent entities selected by the user, or implicit, e.g., an association between two or more individual correspondent entities identified by the communications management application on the basis of common contact information or by other means. The communications management application could, e.g., group the individuals Alice and Pamela Llewellyn together on the basis of a shared phone number. Information used by the communications management application to identify implicit associations between individuals may be local to the communications device, e.g., contact information located in an address book of a mobile device, or may be located on a different computer accessible to the communications device, e.g., a social network server.

Next, the user selects the communications management application's search button and inputs search criteria through the user interface of the mobile device. The communications management application uses the input search criteria to search local and remote data sources for communications events. In this example, as illustrated by search option conceptual view 121, the user opts to search for emails containing the keywords "concert" and "Alice."

At state (III), depicted by conceptual view 130, the communications management application obtains communications events according to the search criteria. In this example the communications events are emails sent through the Gmail communications service. The communications management application organizes and displays the communications events according to default criteria.

Next, the user selects the first communications event. The communications management application responds by interfacing with the Gmail application of the mobile device in order to retrieve the selected email from a server 303, a remote data source, through network 302. The communications management application then displays the communications event, as depicted in state (IV).

Figure 2A:
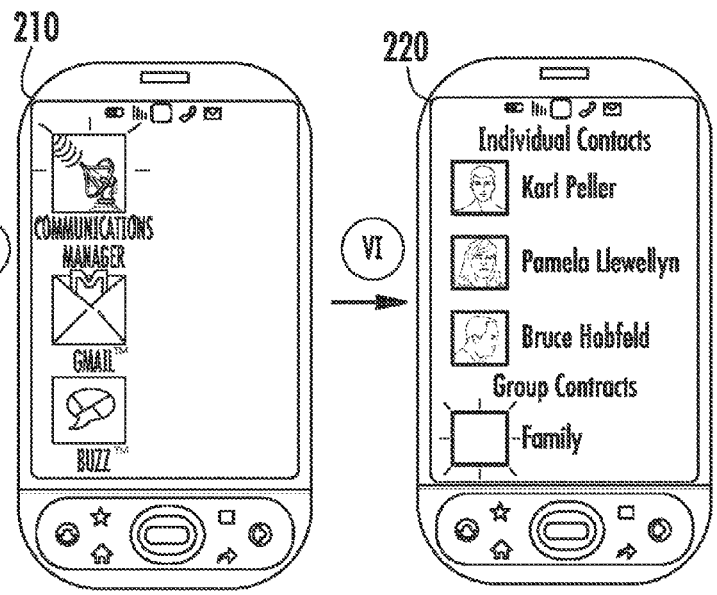
FIGS. 2A and 2B provide additional conceptual views illustrating an example application of a process for the management and display of communication information.
Figure 2B:
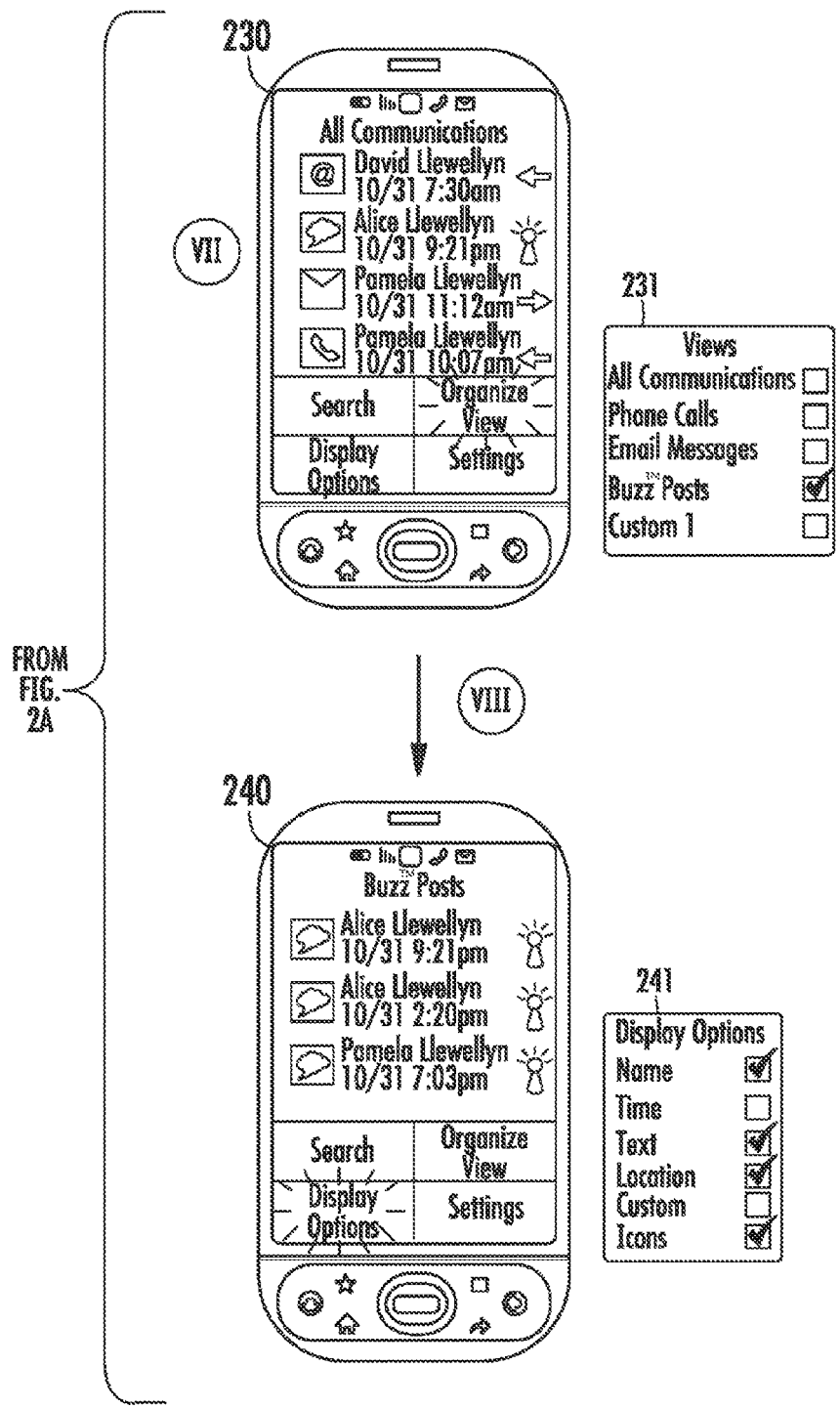

FIGS. 2A and 2B illustrate six example conceptual views, 210, 220, 230, 240, 250, and 260 that are displayed on the mobile device 301 during example states (V), (VI), (VII), (VIII), (IX), and (X), respectively. Together, these six conceptual views provide an additional example of a process for the management and display of communications on a mobile device. The example states (V), (VI), (VII), (VIII), (IX), and (X) may be time-sequenced states, or they may occur in a sequence that is different than the illustrated sequence.

In more detail, at state (V), depicted by conceptual view 210, the user selects an icon located on the home screen of mobile device 301, corresponding to the communications management application.

At state (VI), depicted by conceptual view 220, the mobile device loads the communications management application which, in this example, results in the loading and display of the user's contact list. The user's contact list includes correspondent entities, including multiple individuals as well as a group of individuals identified as "Family." Next, the user selects the "Family" group. This selection constitutes a trigger event.

At state (VII), depicted by conceptual view 230, the communications management application responds to the trigger event by retrieving identification information, by identifying the associated correspondent entity based on the retrieved identification information, and by retrieving, organizing, and displaying communication information relating to communication events associated with that entity. In this example, the displayed events include an email, a Google Buzz™ post, a text message, and a phone call, all associated with members of the "Family" group.

Next, the user selects the communications management application's organize view button and inputs organizational criteria through the user interface of the mobile device. The communications management application then organizes the communication information according to the organizational criteria. In this example, as illustrated by organize view conceptual view 231, the user opts to organize the displayed communication information so as to view only communication information associated with the correspondent entity and pertaining to Google Buzz™ posts. However, the user could organize the communication information differently, by, e.g., opting to view communication information relating to all communications events associated with the correspondent entity, or by restricting the viewed communication information to a combination of information relating to phone calls, email messages, or other communications events defined by a custom organizational criteria and associated with the correspondent entity.

At state (VIII), depicted by conceptual view 240, the user selects the communications management application's display options button and inputs display criteria through the user interface of the mobile device. The communications management application displays the communication information according to the selected criteria. In this example, as illustrated by display options conceptual view 241, the user opts to filter the communication information so as to display only name, text, location, and icon information. However, the user could choose to display different elements of the communication information by applying a different set of filters. For example, the user might choose to filter the displayed communication information so as to display a different combination of name, time, text, location, icon, or custom information.

At state (IX), depicted by conceptual view 250, the user selects a displayed location button corresponding to a geotag associated with a Google Buzz™ post.

At state (X), depicted by conceptual view 260, the communications management application responds to the user's selection of the displayed location button by interfacing with Google Maps™ so as to retrieve and display the depicted location information.

FIG. 3 is a diagram of an example system 300 on which the processes pictured conceptually in FIGS. 1 and 2 and described herein may be implemented. The system includes a mobile device 301 and servers 303 and 304. The mobile device 301 and the servers 303 and 304 are connected via network 302. Network 302 may include one or more networks, such as a local area network, a wide area network, and/or the Internet. One or more of the networks that make up network 302 may be wireless, such as a cellular telephone network or a Wi-Fi network.

Mobile device 301 may be a smartphone, or any other appropriate computer device. Generally speaking, a smartphone is a mobile device that offers advanced computing capabilities, such as the ability to execute applications and to communicate with servers 303 and 304, or other appropriate computing devices.

Mobile device 301 may include a hard drive 308 for storing data and computer programs, and a processing device 306 (e.g., a microprocessor) and memory 307 (e.g., RAM) for executing computer programs. An input/output system 305 displays, to a user, images that are generated by mobile device 301. The input/output system 305 may include a touch-sensitive display screen, allowing a user to enter information onto the display screen via a virtual keyboard. Alternatively or in addition, a physical QWERTY keyboard and/or scroll wheel may be provided for entering information onto the display screen. Mobile device 301, and computer programs executed thereon, may also be configured to accept voice commands, and to perform functions in response to such commands. For example, the processes described herein for the management and display of communication information may be initiated and controlled, to the extent possible, via voice commands.

Mobile device 301 runs an operating system 309. Computer programs, including applications, are stored, e.g., in hard drive 308, and execute on top of the operating system. Among these computer programs is a communications management application 310 which, as described above, may interface with other applications 311 of the mobile device as well as applications 317 of server 303 in order to manage and display communication information. The information involved in the processes described above may be stored as data 312 on hard drive 308 of the mobile device, and/or as data 318 on hard drive 315 of server 303.

Server 303 may include a hard drive 315 for storing data and computer programs, and a processing device 313 (e.g., a microprocessor) and memory 314 (e.g., RAM) for executing computer programs. Server 303 runs an operating system 316, such as a version of Solaris or Linux. Computer programs are stored, e.g., in hard drive 315 or in another computer-readable non-transitory storage medium, and execute on top of the operating system. Among these computer programs are applications 317, which may be related to one or more communications services.

Figure 4:
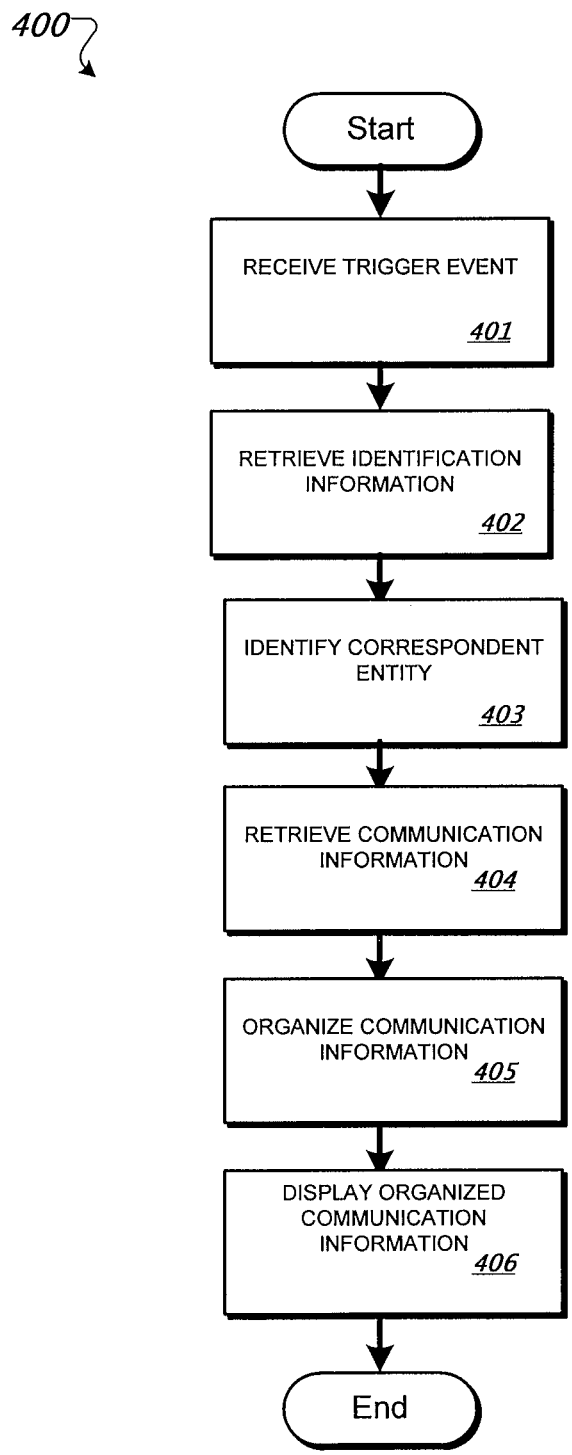
FIG. 4 is a flowchart showing an example process for managing and displaying communication information.

FIG. 4 is a flowchart showing an example process 400 for managing and displaying communication information on a mobile device, e.g., as shown conceptually in FIGS. 1 and 2. The process may be implemented, for example, using system 300. In such an implementation, one or more parts of the process may be executed by communications management application 310, which may interface with other applications 311 of the mobile device 301, with applications 317 of server 303, and/or with additional applications, such as applications of server 304. The communications management application 310 may retrieve information involved in the process, such as identification and communication information, from one or more local or remote data sources, such as hard drive 308 of the mobile device 301, hard drive 315 of server 303, and/or an additional remote data source, such as server 304. Information retrieved from remote data sources may be retrieved through network 302.

Referring to FIG. 4, a mobile device 301 receives a trigger event (401). The trigger event may be, e.g., a communications event received by mobile device 301 through network 302, or an input effected via a user interface 305 of the mobile device 301. Responding to the trigger event, the communications management application 310 retrieves identification information (402). The data sources from which the communications management application 310 retrieves the identification information may be local or remote, and may be associated with one or more communications services.

Next, the communications management application 310 identifies a correspondent entity associated with the trigger event using the retrieved identification information (403). The identified correspondent entity may include one or more individuals, or one or more groups of individuals.

The communications management application 310 then retrieves communication information relating to one or more communications events associated with the correspondent entity (404). The communications events may include one or more communications events directed between the user of the mobile device and the correspondent entity (e.g., emails, phone calls, or SMS messages). The communications events may also include one or more communications events originating with the correspondent entity but not necessarily directed to the user (e.g., social network posts).

Next, the communications management application organizes the retrieved communication information (405). Finally, the organized communication information is displayed (406). The organized communication information may be displayed, for example, through the input/output system 305 of mobile device 301.

Figure 5:
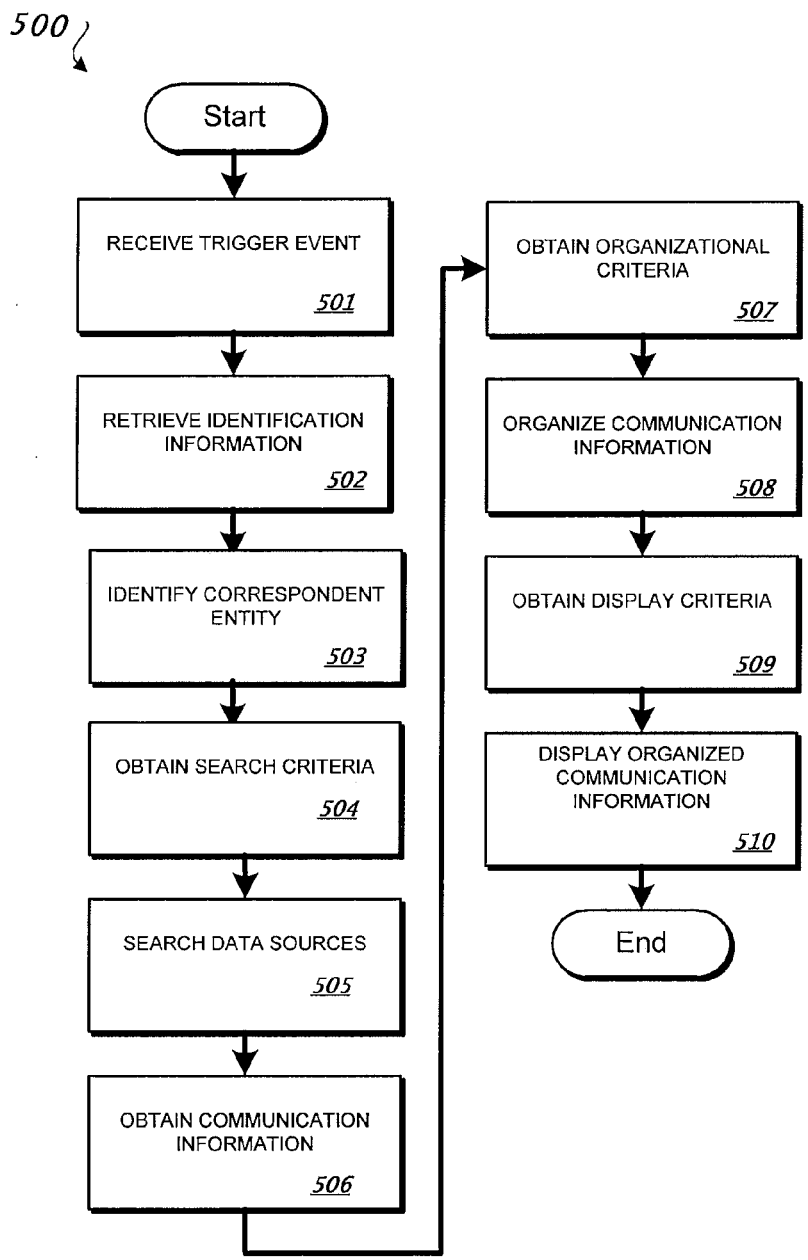
FIG. 5 is a flowchart showing an additional example process for managing and displaying communication information.

FIG. 5 is a flowchart showing an additional example process 500 for managing and displaying communication information on a mobile device, e.g., as shown conceptually in FIGS. 1 and 2. The process may be implemented, for example, using system 300. In such an implementation, the process may be executed by communications management application 310, which may interface with other applications 311 of the mobile device 301, with applications 317 of server 303, or with additional applications, such as applications of server 304. Information involved in the process may be obtained from one or more local or remote data sources, such as hard drive 308 of the mobile device 301, hard drive 315 of server 303, and/or an additional remote data source, such as server 304. Information retrieved from remote data sources may be retrieved through network 302.

Referring to FIG. 5, a mobile device 301 receives a trigger event (501). The trigger event may include, for example, a communications event received by mobile device 301 through network 302, or an input effected via a user interface 305 of the mobile device 301. In the example depicted in conceptual view 220 of FIG. 2 the trigger event is the user selection of a communications group including multiple correspondent entities effected via user interface 305, while in the example depicted in conceptual view 110 of FIG. 1, the trigger event is an incoming phone call.

Next, communications management application 310 retrieves identification information (502). The identification information may be retrieved from one or more local or remote data sources, which may be associated with one or more communications services. The process continues with the identification of a correspondent entity associated with the trigger event (503). The communications management application 310 identifies the correspondent entity using the retrieved identification information (503). The identified correspondent entity may include one or more individuals or one or more groups of individuals. In conceptual view 110 of FIG. 1, e.g., the communications management application 310 retrieves identification information identifying the correspondent entity, an individual, responsible for the incoming phone call.

The communications management application obtains search criteria from one or more local or remote sources (504). Conceptual view 121 of FIG. 1, e.g., depicts search criteria obtained through user input. Obtaining the search criteria facilitates the retrieval of communication information relating to one or more communications events associated with the correspondent entity. Accordingly, the communications management application 310 uses the search criteria to search one or more local or remote sources for the one or more communications events (505). The communications management application obtains communication information based on the search (506).

The communications management application 310 obtains organizational criteria from one or more local or remote sources (507), and organizes the communication information in accordance with the obtained organizational criteria (508). Conceptual view 231 of FIG. 2, e.g., depicts organizational criteria obtained by the communications management application 310 through user input, and conceptual view 240 of FIG. 2 depicts communications information organized according to the organizational criteria depicted in conceptual view 231.

The communications management application 310 obtains display criteria from one or more local or remote sources (509). Conceptual view 241 of FIG. 2, e.g., depicts display criteria obtained by the communications management application 310 through user input. The communications management application 310 then displays the organized communication information in accordance with the obtained display criteria (510). The organized communication information may be displayed, for example, through the input/output system 305 of mobile device 301.

Figure 6:
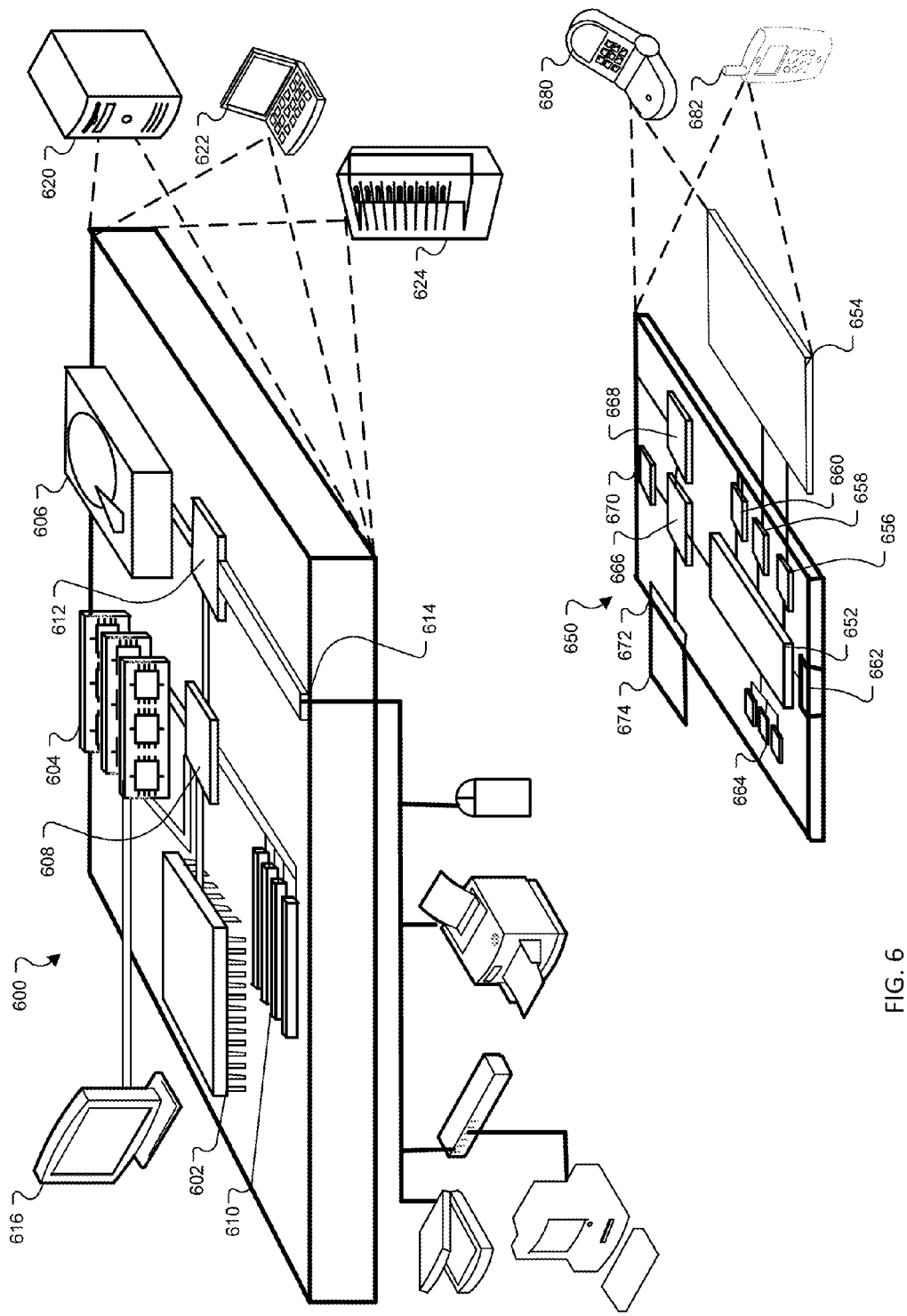
FIG. 6 shows an example of a computer device and a mobile computing device that can be used to implement the processes described herein.

FIG. 6 shows an example of a generic computer device 600 and a generic mobile computer device 650, which may be used to implement the processes described herein, including the mobile-side and server-side processes for installing a computer program from a mobile device to a computer. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable medium, such as the memory 604, the storage device 606, memory on processor 602, or a propagated signal. For example, the information carrier may be a non-transitory, machine-readable storage medium.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A method for displaying communication information on a mobile communications device, the method comprising:
   receiving a trigger event on the mobile communications device;
   retrieving identification information in response to the trigger event;
   identifying a correspondent entity associated with the trigger event based on the identification information;
   retrieving communication information relating to two or more communications events associated with the correspondent entity, wherein the two or more communications events comprise: (1) a first communications event originating with the correspondent entity but not directed to, or received from, a user of the mobile communications device, and (2) a second communications event that is either directed to the user of the mobile communications device and originating with the correspondent entity, or directed to the correspondent entity and originating with the user of the mobile communications device, wherein retrieving the communication information comprises:
      obtaining search criteria from one or more sources,
      using the search criteria to search the one or more local or remote data sources for the two or more communications events, and
      obtaining the communication information from the one or more local or remote data sources based on the search;
      organizing the communication information;
   displaying the organized communication information in one or more views on the mobile communications device;
   responsive to identifying a correspondent entity associated with the trigger event based on the identification information, obtaining, by a communications management application of the mobile communications device, a first set of organizational criteria and a first set of display criteria, wherein the communication information is organized according to the first set of organizational criteria, and wherein the communication information is displayed according to the first set of display criteria;
   receiving a second trigger event on the mobile communications device;
   retrieving a second identification information in response to the trigger event;
   identifying a second correspondent entity associated with the second trigger event based on the second identification information; and
   responsive to identifying the second correspondent entity associated with the second trigger event based on the second identification information, obtaining, by the communications management application of the mobile communications device, a second set of organizational criteria and a second set of display criteria.

2. The method of claim 1, wherein the trigger event comprises an input effected via a user interface of the mobile communications device.

3. The method of claim 1, wherein the trigger event comprises a communications event received on the mobile communications device.

4. The method of claim 1, wherein the one or more local or remote data sources are associated with one or more communication services.

5. The method of claim 1, wherein the communications management application of the mobile communications device interfaces with other applications of the mobile communications device or with applications of other computers.

6. The method of claim 1, wherein the two or more communications events associated with the correspondent entity comprise one or more communications events directed between a user of the mobile communications device and the correspondent entity, and one or more communications events originating with the correspondent entity but not directed to the user.

7. The method of claim 1, wherein the correspondent entity comprises one or more individuals or one or more groups of individuals.

8. The method of claim 1, wherein the two or more communications events comprise at least one social network post.

9. The method of claim 1, further comprising:
determining that the two or more communications events comprise the first communications event originating with the correspondent entity but not directed to, or received from, a user of the mobile communications device, and the second communications event that is either directed to the user of the mobile communications device and originating with the correspondent entity, or directed to the correspondent entity and originating with the user of the mobile communications device; and
displaying, with the organized communication information, an icon indicating that at least one communications event to which the displayed communication information relates originated with the correspondent entity but was not directed to, or received from, a user of the mobile communications device.

10. The method of claim 1, further comprising:
responsive to one or more user inputs to the mobile communications device:
identifying a first communications event associated with the correspondent entity;
interfacing, by a communications management application of the mobile communications device, with one or more additional applications;
retrieving content associated with the first communications event and with the one or more additional applications, wherein the retrieved content is not communication information; and displaying the retrieved content.

11. A system for displaying communication information on a mobile communications device, the system comprising:
one or more processing devices; and
non-transitory computer-readable memory having instructions stored thereon which, when executed by the one or more processing devices, cause the one or more processing devices to perform operations comprising:
receiving a trigger event on the mobile communications device;
retrieving identification information in response to the trigger event;
identifying a correspondent entity associated with the trigger event based on the identification information;
retrieving communication information relating to two or more communications events associated with the correspondent entity, wherein the two or more communications events comprise: (1) a first communications event originating with the correspondent entity but not directed to, or received from, a user of the mobile communications device, and (2) a second communications event that is either directed to the user of the mobile communications device and originating with the correspondent entity, or directed to the correspondent entity and originating with the user of the mobile communications device, wherein retrieving the communication information comprises:
obtaining search criteria from one or more sources,
using the search criteria to search the one or more local or remote data sources for the two or more communications events, and
obtaining the communication information from the one or more local or remote data sources based on the search;
organizing the communication information;
displaying the organized communication information in one or more views on the mobile communications device;
responsive to identifying a correspondent entity associated with the trigger event based on the identification information, obtaining, by a communications management application of the mobile communications device, a first set of organizational criteria and a first set of display criteria, wherein the communication information is organized according to the first set of organizational criteria, and wherein the communication information is displayed according to the first set of display criteria;
receiving a second trigger event on the mobile communications device;
retrieving a second identification information in response to the trigger event;
identifying a second correspondent entity associated with the second trigger event based on the second identification information; and
responsive to identifying the second correspondent entity associated with the second trigger event based on the second identification information,
obtaining, by the communications management application of the mobile communications device, a second set of organizational criteria and a second set of display criteria.

12. The system of claim 11, wherein the trigger event comprises an input effected via a user interface of the mobile communications device.

13. The system of claim 11, wherein the trigger event comprises a communications event received on the mobile communications device.

14. The system of claim 11, wherein the one or more local or remote data sources are associated with one or more communication services.

15. The system of claim 11, wherein the communications management application of the mobile communications device interfaces with other applications of the mobile communications device or with applications of other computers.

16. The system of claim 11, wherein the two or more communications events associated with the correspondent entity comprise one or more communications events directed between a user of the mobile communications device and the correspondent entity, and one or more communications events originating with the correspondent entity but not directed to the user.

17. The system of claim 11, wherein the correspondent entity comprises one or more individuals or one or more groups of individuals.

18. The system of claim 11, wherein the two or more communications events comprise at least one social network post.

19. The system of claim 11, wherein the instructions cause the one or more processing devices to perform operations comprising:
- determining that the two or more communications events comprise the first communications event originating with the correspondent entity but not directed to, or received from, a user of the mobile communications device, and the second communications event that is either directed to the user of the mobile communications device and originating with the correspondent entity, or directed to the correspondent entity and originating with the user of the mobile communications device; and
- displaying, with the organized communication information, an icon indicating that at least one communications event to which the displayed communication information relates originated with the correspondent entity but was not directed to, or received from, a user of the mobile communications device.

20. The system of claim 11, the instructions cause the one or more processing devices to perform operations comprising:
- responsive to one or more user inputs to the mobile communications device:
- identifying a first communications event associated with the correspondent entity; interfacing, by a communications management application of the mobile communications device, with one or more additional applications;
- retrieving content associated with the first communications event and with the one or more additional applications, wherein the retrieved content is not communication information; and
- displaying the retrieved content.

21. One or more computer-readable non-transitory storage media storing instructions that are executable by one or more processing devices to perform operations comprising:
- receiving a trigger event on a mobile communications device;
- retrieving identification information in response to the trigger event;
- identifying a correspondent entity associated with the trigger event based on the identification information;
- retrieving communication information relating to two or more communications events associated with the correspondent entity, wherein the two or more communications events comprise: (1) a first communications event originating with the correspondent entity but not directed to, or received from, a user of the mobile communications device, and (2) a second communications event that is either directed to the user of the mobile communications device and originating with the correspondent entity, or directed to the correspondent entity and originating with the user of the mobile communications device, wherein retrieving the communication information comprises:
  obtaining search criteria from one or more sources,
  using the search criteria to search the one or more local or remote data sources for the two or more communications events, and
  obtaining the communication information from the one or more local or remote data sources based on the search;
  organizing the communication information;
  displaying the organized communication information in one or more views on the mobile communications device;
- responsive to identifying a correspondent entity associated with the trigger event based on the identification information, obtaining, by a communications management application of the mobile communications device, a first set of organizational criteria and a first set of display criteria, wherein the communication information is organized according to the first set of organizational criteria, and wherein the communication information is displayed according to the first set of display criteria;
- receiving a second trigger event on the mobile communications device;
- retrieving a second identification information in response to the trigger event; identifying a second correspondent entity associated with the second trigger event based on the second identification information; and
- responsive to identifying the second correspondent entity associated with the second trigger event based on the second identification information, obtaining, by the communications management application of the mobile communications device, a second set of organizational criteria and a second set of display criteria.

22. The computer readable non-transitory storage media of claim 21, wherein the trigger event comprises a communications event received on the mobile communications device.

* * * * *